US009260097B2

(12) United States Patent
Calvo Martinez et al.

(10) Patent No.: US 9,260,097 B2
(45) Date of Patent: Feb. 16, 2016

(54) VACUUM BRAKE SERVO FOR A MOTOR VEHICLE BRAKING SYSTEM

(75) Inventors: José Manuel Calvo Martinez, Kruft (DE); Jens Sparfeld, Miehlen (DE); Detlev Knigge, Kaltenengers (DE); Ulrich Zinnkann, Koblenz (DE)

(73) Assignee: Lucas Automotive GmbH, Koblenz (DE)

( * ) Notice: Subject to any disclaimer, the term of this patent is extended or adjusted under 35 U.S.C. 154(b) by 765 days.

(21) Appl. No.: 13/504,308

(22) PCT Filed: Oct. 21, 2010

(86) PCT No.: PCT/EP2010/006447
§ 371 (c)(1),
(2), (4) Date: May 29, 2012

(87) PCT Pub. No.: WO2011/050925
PCT Pub. Date: May 5, 2011

(65) Prior Publication Data
US 2012/0227579 A1    Sep. 13, 2012

(30) Foreign Application Priority Data
Oct. 29, 2009    (DE) .......................... 10 2009 051 236

(51) Int. Cl.
*B60T 13/57*    (2006.01)

(52) U.S. Cl.
CPC ...................................... *B60T 13/57* (2013.01)

(58) Field of Classification Search
CPC .................................. B60T 13/57; B60T 13/52
USPC .................................. 91/369.1, 369.2, 376 R
See application file for complete search history.

(56) References Cited

U.S. PATENT DOCUMENTS

| 4,821,623 | A | * | 4/1989 | Shinohara | 91/376 R |
| 4,987,824 | A | * | 1/1991 | Shinohara et al. | 91/369.1 |
| 5,014,597 | A | * | 5/1991 | Rueffer et al. | 91/369.2 |
| 5,115,718 | A | * | 5/1992 | Gautier et al. | 91/369.2 |
| 5,279,203 | A | * | 1/1994 | Gautier et al. | 91/369.1 |
| 5,367,942 | A | * | 11/1994 | Nell et al. | 91/376 R |
| 6,227,099 | B1 | * | 5/2001 | Kahrs et al. | 91/376 R |

(Continued)

FOREIGN PATENT DOCUMENTS

| DE | 2918734 A1 | 11/1980 |
| DE | 3243093 A1 | 5/1983 |

(Continued)

*Primary Examiner* — Thomas E Lazo
(74) *Attorney, Agent, or Firm* — MacMillan, Sobanski & Todd, LLC

(57) ABSTRACT

A vacuum brake servo includes a force input element, a control valve actuated by the force input element, a vacuum chamber connected to a vacuum source, and an operating chamber which, depending on the actuation of the force input element, can be connected to either the vacuum chamber or the surrounding atmosphere. The control valve has a control piston that can be actuated by the force input element and, together with a valve element, forms a seal seat having a seal seat diameter between the operating chamber and the surrounding atmosphere. In the area close to the seal seat, a guide channel is provided. When the seal seat is opened, air from the surrounding atmosphere flows into the operating chamber. The guide channel extends axially with a constant flow diameter over a predetermined length, wherein the flow diameter is less than or equal to the seal seat diameter.

14 Claims, 3 Drawing Sheets

(56) References Cited

U.S. PATENT DOCUMENTS

| | | | |
|---|---|---|---|
| 6,422,124 B1* | 7/2002 | Schonlau et al. | 91/369.2 |
| 7,066,073 B1* | 6/2006 | Wagner | 91/376 R |
| 7,322,269 B2* | 1/2008 | Faller et al. | 91/376 R |
| 7,954,909 B2* | 6/2011 | Yamashita | 91/369.1 |
| 8,029,073 B2* | 10/2011 | Attard | 91/376 R |
| 8,297,178 B2* | 10/2012 | Becker | 91/367 |
| 8,561,520 B2* | 10/2013 | Ickler et al. | 91/376 R |
| 2002/0170427 A1* | 11/2002 | Fanelli et al. | 92/169.3 |
| 2009/0188385 A1* | 7/2009 | Anderson et al. | 91/376 R |
| 2010/0192763 A1 | 8/2010 | Becker | |
| 2010/0288119 A1 | 11/2010 | Ickler et al. | |

FOREIGN PATENT DOCUMENTS

| | | |
|---|---|---|
| DE | 3924672 A1 | 1/1991 |
| DE | 4027562 A1 | 3/1992 |
| DE | 4032534 A1 | 4/1992 |
| DE | 102006053142 A1 | 2/2008 |
| DE | 102008037048 A1 | 5/2009 |
| GB | 2271402 A | 4/1994 |

* cited by examiner

VACUUM BRAKE SERVO FOR A MOTOR VEHICLE BRAKING SYSTEM

CROSS-REFERENCE TO RELATED APPLICATIONS

This application is a national stage of International Application No. PCT/EP2010/006447 filed Oct. 21, 2010, which claimed priority to German Patent Application No. 10 2009 051 236.5 filed Oct. 29, 2009, the disclosures of which are incorporated herein by reference.

BACKGROUND OF THE INVENTION

The present invention relates to a vacuum brake booster for a motor vehicle brake system comprising a rod-like force input member, which is coupled or can be coupled with a brake pedal, a control valve, which can be actuated by means of the force input member, a chamber arrangement having a vacuum chamber, which is connectable to a vacuum source, as well as a working chamber, which is, in accordance with the actuation of the force input member, selectively connectable to the vacuum chamber and to the surrounding atmosphere, wherein the control valve has a control piston actuatable by means of the force input member, which control piston forms together with a valve element a sealing seat having a sealing seat diameter between the working chamber and the surrounding atmosphere, wherein in the region close to the sealing seat a guiding channel is provided through which, upon the opening of the sealing seat, air flows from the surrounding atmosphere into the working chamber due to a pressure difference.

In the course of technical development in the field of automotive engineering, it is becoming possible to reduce the noise level in the passenger compartment of a motor vehicle further and further. But this can also be achieved, in particular, by reducing the emission of such noises through better acoustic insulation of the passenger compartment. However, other noises produced in the vehicle, which were previously masked by the drive noises and rolling noises, are thereby more easily heard. These include, for example, the intake noise of a vacuum brake booster, which occurs when the brake booster is actuated from its rest position. Owing to the actuation, the working chamber, which is evacuated in the initial state, is connected to the surrounding atmosphere, whereupon surrounding air flows into the working chamber in some cases at high velocity in order to provide a servo assistance for the brake actuation, in a manner known per se. The relatively high flow velocities may also give rise to flow noises in frequency ranges lying in the range of human hearing. Experience has shown here that particularly noises which arise in the frequency range between 2.4 kHz and 8 kHz are felt to be disturbing.

In the prior art, various solutions are known for reducing inflow noises in vacuum brake boosters.

For instance, the generic prior art according to document DE 32 43 093 A1 discloses a vacuum brake booster in which a foam element is provided in the control valve, the geometry of which element is configured such that the cross-sectional area of the guiding channel is reduced. This prior art provides, for example, a plurality of cylindrical openings in the foam element which extend parallel to the force input member.

A comparable solution with a foam element is known from the document DE 29 18 734 A1.

Finally, the document DE 39 24 672 A1 discloses a vacuum brake booster in which a nozzle arrangement with relatively complicated geometry, intended to impart a laminar flow to the sucked-in air, is arranged in the control valve.

All the solutions from the prior art provide additional parts with relatively complicated geometry which increase the production costs of such brake boosters undesirably. Moreover, durability problems may arise when using foam parts.

BRIEF SUMMARY OF THE INVENTION

It is a feature of the present invention to provide a vacuum brake booster of the kind described in the introduction, in which an effective reduction of the inflow noises can be achieved with simple and inexpensive means.

This feature is achieved by a vacuum brake booster of the kind described in the introduction, in which it is provided that the guiding channel extends in the axial direction with a constant flow diameter over a predetermined length, wherein the flow diameter is less than or equal to the sealing seat diameter.

The inventors have discovered that the inflow noises in a vacuum brake booster can be reduced simply by giving the guiding channel over a predetermined length a constant flow diameter which is less than the effective flow diameter of the downstream sealing seat between the surrounding atmosphere and the working chamber. In this way, a calming of the air flow which arises upon activation of the vacuum brake booster can be achieved in the guiding channel. As a result, the noises, mentioned in the introduction in a frequency range of 2.4 kHz to 8 kHz which are felt to be disturbing, are damped or displaced to a different frequency range in which they are less disturbing or no longer audible at all to human hearing.

A development of one feature of the invention provides that the control valve has a clamping sleeve, which is provided for firmly clamping a fastening section of the valve element in a control valve housing of the control valve. Such clamping sleeves may, for example, be pressed against a corresponding shoulder of a control valve housing by return springs in the control valve which act on the force input member. For example, a control valve element can be clamped between the clamping sleeve and the shoulder of the control valve housing. In this connection, according to the invention it may be provided that the guiding channel is formed at least partly by a radially inner cylindrical section of the clamping sleeve. In other words, the clamping sleeve may be designed directly as a component which forms the guiding channel and accordingly be formed—without additional components—with the desired geometry, i.e. with a guiding channel having a predetermined flow diameter over a predetermined length.

Alternatively to this, it may also be provided that the guiding channel is formed by a separate component. For instance, according to the invention it is also possible for the guiding channel to be formed at least partly by a guiding channel sleeve, which is mounted in the control valve housing, preferably via the clamping sleeve. It is thereby possible to continue to use conventional components of a vacuum brake booster already produced and, for the reduction of the flow diameter according to the present invention, to fit an additional component which nevertheless is of relatively simple construction and therefore inexpensive to produce. The guiding channel sleeve may be made of hard dimensionally stable plastic material. Furthermore, according to one aspect of the invention it is possible for the guiding channel sleeve to have a radial projection, by which it is mounted in the control valve housing, preferably on a diameter step of the clamping sleeve. The guiding channel sleeve can be fitted on the clamping sleeve by this radial projection, for example once again by using a spring which is provided anyway. Such a spring may, for example, be the return spring for the force input member or a biasing spring provided for biasing the valve element on the sealing seat.

Furthermore, according to one aspect of the invention it may be provided that the guiding channel sleeve extends, starting from the radial projection, in at least one axial direction to form the guiding channel. As required, the guiding channel sleeve may thus be formed with the desired length for achieving the calming of the air flow which is being sought.

A development of one feature the invention provides for stepwise reduction of the flow cross-section. In this connection, it may be provided that the guiding channel is of stepped form with flow channel sections of different flow diameters, and narrows in the direction towards the valve seat, the flow channel section with the smallest flow diameter being less than or equal to the sealing seat diameter. Preferably, in this case it is provided that the guiding channel is of rounded form in the region of flow diameter steps, in order to achieve smooth transitions between the sections of different diameter.

A further contribution to the calming of the flow may also be provided by the guiding channel being of smoothly rounded form in its inlet region facing the surrounding atmosphere. This results in a low-turbulence inflow of the surrounding air, sucked in by the working chamber upon the opening of the valve seat, into the guiding channel, thus promoting the laminarity of the flow and hence the flow calming.

A development of one feature of the invention provides that the force input member extends through the guiding channel substantially concentrically thereto.

Furthermore, according to the invention it may be provided that the at least one filter element is arranged upstream of the guiding channel. This filter element may be designed to filter the surrounding air sucked in.

Empirical investigations and experiments have shown that particularly good results are achieved if the predetermined length of the guiding channel lies between 6 mm and 14 mm. Furthermore, during these experiments, it has also been shown that, additionally or alternatively, it is beneficial for the calming of the air flow if the flow diameter is dimensioned such that a flow opening with an effective area between 110 mm$^2$ and 160 mm$^2$ results. If the force input member is passed through the guiding channel, the cross-sectional area of the force input member which does not contribute to the flow cross-section is to be taken into account accordingly.

Other advantages of this invention will become apparent to those skilled in the art from the following detailed description of the preferred embodiments, when read in light of the accompanying drawings.

DETAILED DESCRIPTION OF THE INVENTION

Figure 1:
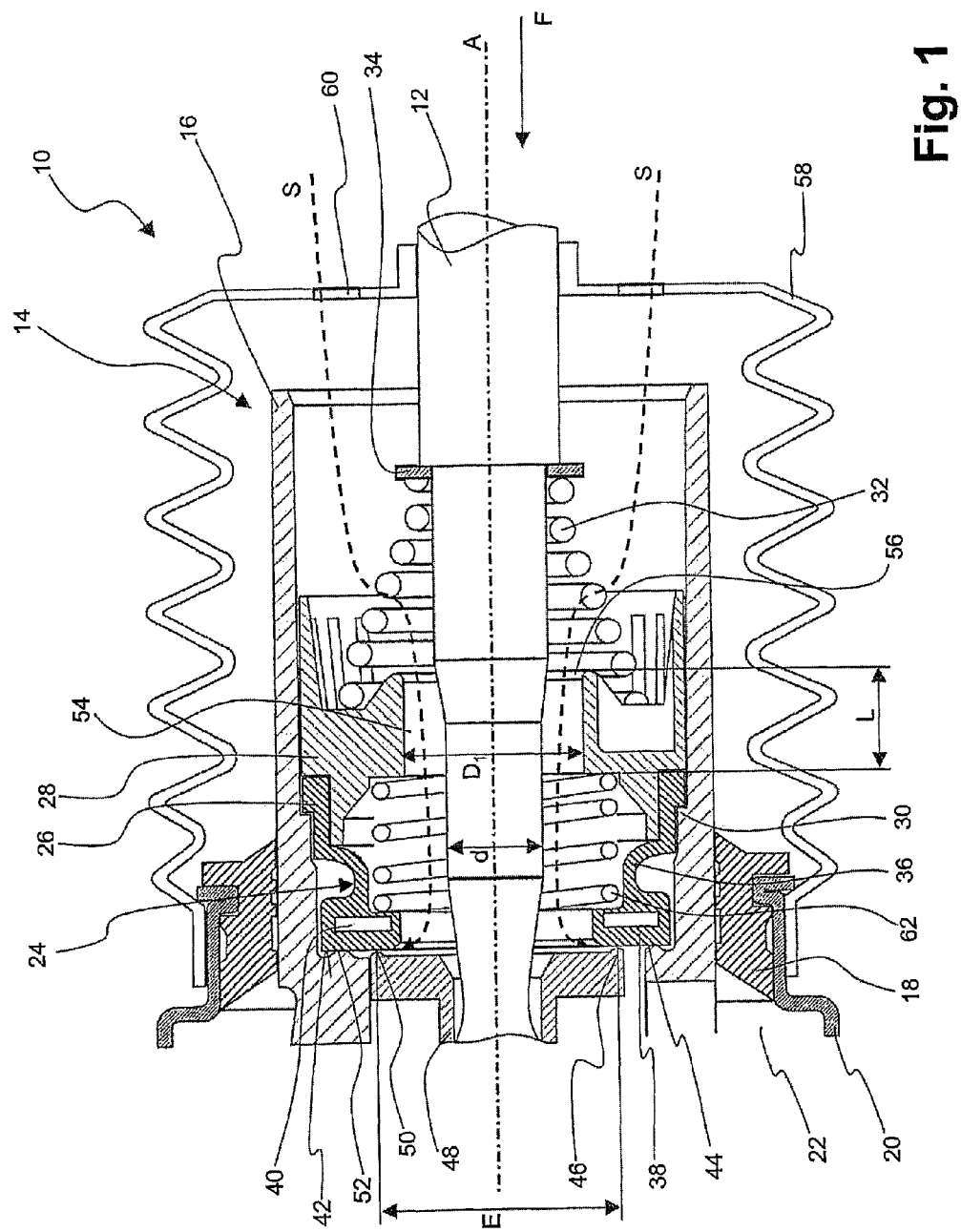
FIG. 1 shows a sectional view through the region of the control valve of a vacuum brake booster according to a first exemplary embodiment of the present invention.

FIG. 1 shows a detail of a vacuum brake booster according to the invention in an axis-containing longitudinal sectional view, and designated generally by 10. This vacuum brake booster comprises a force input member 12, which at its right-hand end in FIG. 1 faces a connection mechanism, by which it is coupled or can be coupled with a brake pedal. At its left-hand end in FIG. 1, the force input member 12 faces in the direction of a brake master cylinder arrangement (not shown). A control valve 14 is arranged in the vacuum brake booster 10 around the force input member 12. This control valve comprises a control valve housing 16, which is displaceably guided in a brake booster housing 20 in a sealing manner via a seal 18. Arranged in this brake booster housing 20 is a chamber arrangement, which has, in a manner known per se, a working chamber 22 and a vacuum chamber (not shown), the working chamber and the vacuum chamber being separated from one another via a moveable wall (not shown) guided in the housing 20. In operation, pressure differences arise at the moveable wall which, as is known, enable a servo assistance of a braking procedure.

The control valve 14 has a valve element 24 fixed in the control valve housing 16. This valve element is clamped, via an annular section 26, by means of a clamping sleeve 28 against a shoulder 30 on the control valve housing 16. The clamping force is achieved by means of a return spring 32, which is supported, via a securing ring 34, on a diameter step of the force input member 12. The valve element 24 has an elastic membrane 36, which allows a sealing section 38, reinforced by an inserted annular disc 40 against undesired deformations, to move in the direction of the longitudinal axis A. The sealing section 38 has a sealing surface 42 running substantially orthogonal to the longitudinal axis A. This sealing surface cooperates in a sealing manner with a sealing projection 44, running all the way round, on the control valve housing. Furthermore, this sealing surface 42 cooperates with a further sealing projection 46 on a control piston 48, which is coupled with the force input member 12 for joint movement. The sealing projection 46, running all the way round, forms together with the sealing section 38 a first sealing seat 50. The sealing ring 44 forms with the sealing section 38 a second sealing seat 52.

As a result of an actuation of the force input member 12 by subjecting it to the force F, the force input member 12 is displaced towards the left in FIG. 1 and carries along the control piston 48 in the process. The first sealing seat 50 is thereby opened, i.e. the sealing projection 46 lifts off from the sealing section 38. Consequently, the working chamber 22, evacuated with respect to the surrounding atmosphere U and under a vacuum, is connected to the surrounding atmosphere U and, depending on the pressure difference, surrounding air from the surrounding atmosphere U flows at a greater or lesser flow velocity along the flow lines S through the control valve 14 into the working chamber 22.

In order to suppress the flow noises, mentioned in the introduction, during this process, in the embodiment of the invention shown in FIG. 1, the clamping sleeve 28 is provided with a guiding channel 54 having a diameter $D_1$ and a length L. The diameter $D_1$ is determined such that, while taking account of the diameter d of the force input member 12, a flow opening having an area of the order of 110 to 160 mm.sup.2 results. The length L lies in the range between 6 and 14 mm. The inlet region 56 of the guiding channel 54 is smoothly rounded by forming the clamping sleeve free of edges in this inlet region 56.

It can be seen that the diameter $D_1$ of the guiding channel 56 is considerably less than the effective flow diameter E of the first sealing seat 50, which becomes active upon activation of the vacuum brake booster 10. This measure, i.e. the choice of diameter and the length dimensioning of the guiding channel 54, makes it possible to calm the inlet flow S through the control valve 14 and thereby minimize the intake noises of the vacuum brake booster 10 which are felt to be disturbing by passengers.

It remains to be added that a rubber bellows 58 is coupled to the vacuum brake booster housing 20 and protects the control valve 14 from surrounding influences, this rubber bellows 58 having through-openings 60. Furthermore, it can be seen that the sealing section 38 of the valve element 24 is supported on the clamping sleeve 28 via a biasing spring 62. This biasing spring 62 biases the sealing region 38 towards the left in FIG. 1, in order to ensure abutment with the sealing projections 44 and/or 46 depending on the operating situation.

Furthermore, it remains to be added that the sealing seat 52, upon opening, provides a connection between the working chamber and the vacuum chamber.

Figure 2:
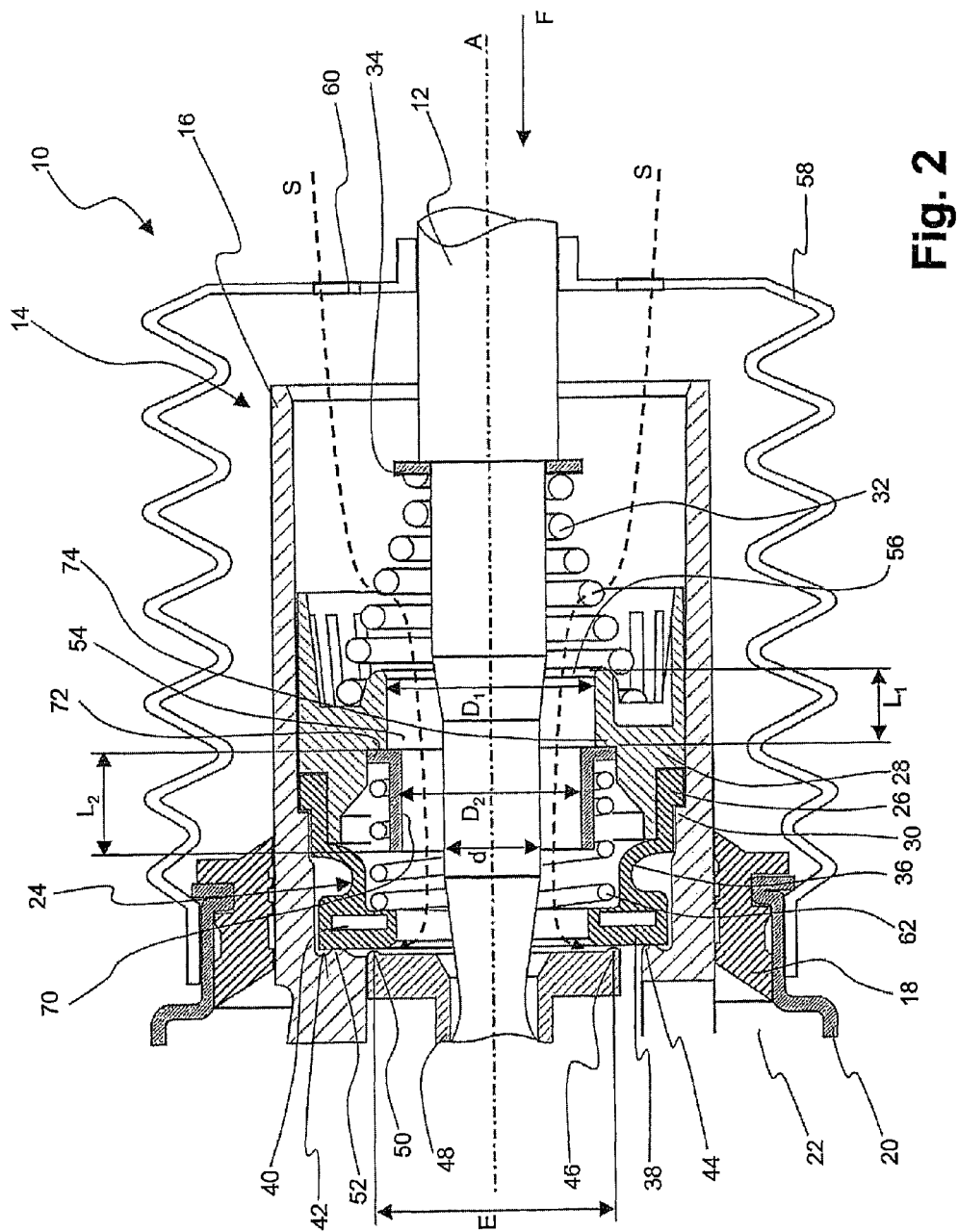
FIG. 2 shows a view corresponding to FIG. 1 of a second exemplary embodiment of the present invention.

The second embodiment of the invention according to FIG. 2 corresponds largely to the first embodiment. In the following, therefore, only the differences between the two embodiments will be discussed. To avoid repetition and facilitate understanding, the same reference symbols as with reference to FIG. 1 are used for the same components.

One main difference between the embodiment according to FIG. 1 and the embodiment according to FIG. 2 is that in the embodiment according to FIG. 2 a further guiding channel sleeve 70 is provided in addition to the guiding channel 54 in the clamping sleeve 28. This guiding channel sleeve 70 has a radial projection 72 which extends radially outwards from the right-hand end of the guiding channel sleeve 70 in FIG. 2 and is clamped against a corresponding shoulder 74 of the clamping sleeve by the spring 62. The guiding channel sleeve 70 has, in addition to the length $L_1$ of the guiding channel 54 in the clamping sleeve 28, a length $L_2$ which lies in the range between 6 and 14 mm. Accordingly, the length $L_1$ can be chosen to be shorter. The diameter $D_2$ of the guiding channel sleeve 70 is chosen to be less than the diameter $D_1$ of the clamping sleeve 28. This results in a diameter step, on entry into the guiding channel sleeve 70, which is of sharp form in FIG. 2. However, this diameter step may also be made less sharp-edged by rounding. The diameter $D_2$ is in any case markedly less than the diameter E of the sealing seat 50 which is active upon the intake of surrounding air.

Figure 3:
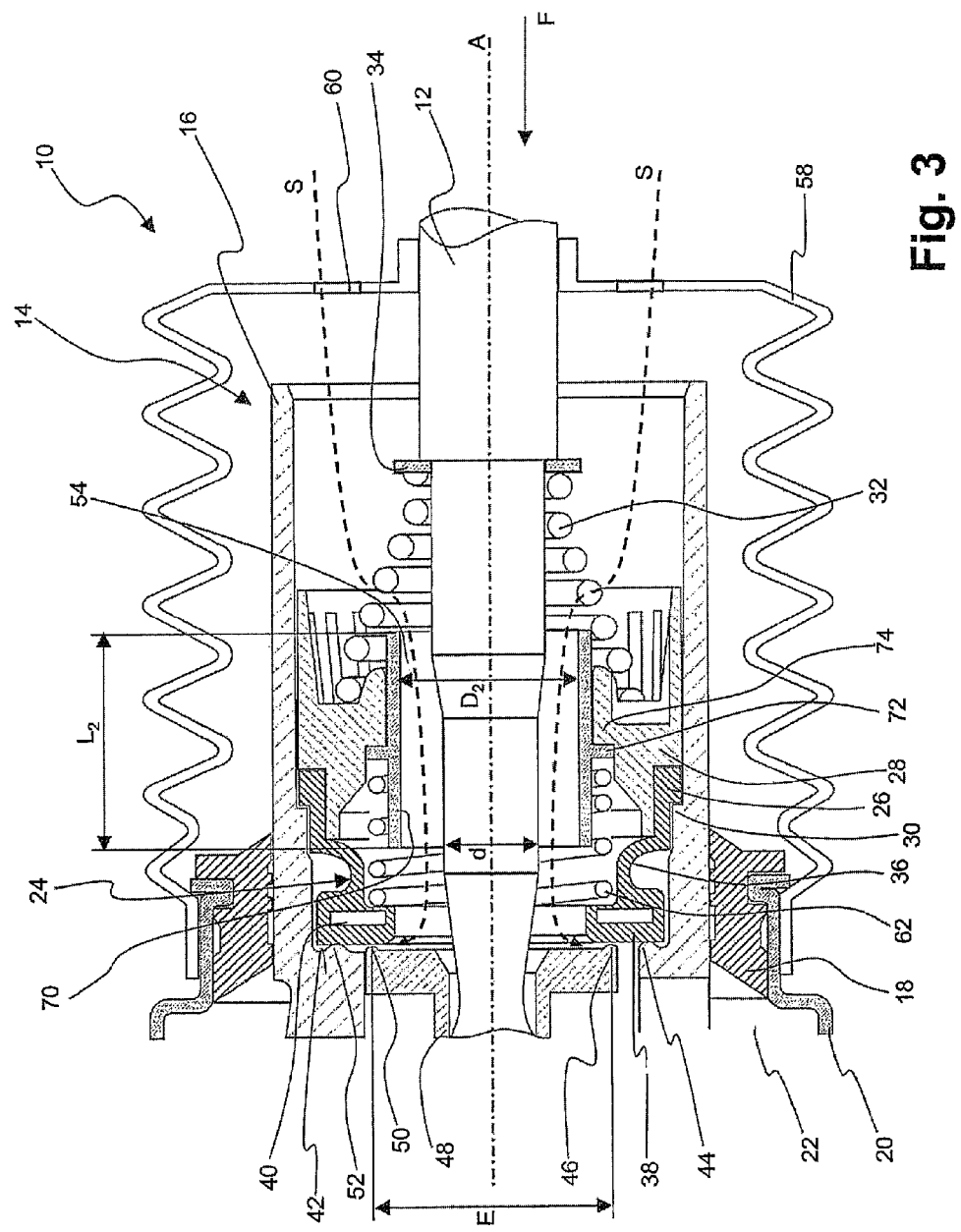
FIG. 3 shows a view corresponding to FIGS. 1 and 2 of a third exemplary embodiment of the present invention.

FIG. 3 shows a further embodiment of the invention, which is based on the embodiment according to FIG. 2. The main difference is that the guiding channel sleeve 70' extends beyond the radial projection 72 in the axial direction towards the left and towards the right in FIG. 3. The length $L_2$ of the guiding channel 54 can thereby be increased as required, in order to influence the flow properties of the guiding channel and thereby also its acoustic properties in a correspondingly favourable manner with the aim of reducing the noise.

The invention provides overall, by suitable dimensioning of the guiding channel 54 with respect to its length and its effective flow diameter, a simple and effective way of reducing or minimising flow noises felt to be disturbing.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. Vacuum brake booster for a motor vehicle brake system, comprising:
   a rod-like force input member, which is coupled or can be coupled with a brake pedal,
   a control valve, which can be actuated by means of the force input member,
   a chamber arrangement having a vacuum chamber, which is connectable to a vacuum source, as well as a working chamber, which is, in accordance with the actuation of the force input member, selectively connectable to the vacuum chamber and to the surrounding atmosphere,
   wherein the control valve has a control piston actuatable by means of the force input member, which control piston forms together with a valve element,
   a sealing seat having a sealing seat diameter between the working chamber and the surrounding atmosphere,
   wherein in the region close to the sealing seat a guiding channel is provided through which, upon the opening of the sealing seat, air flows from the surrounding atmosphere into the working chamber due to a pressure difference,
   wherein the guiding channel extends in the axial direction with a constant flow diameter over a predetermined length, wherein the flow diameter is less than or equal to the sealing seat diameter, and
   wherein the predetermined length of the guiding channel lies between about 6 mm and 14 mm.

2. Vacuum brake booster according to claim 1, wherein the control valve has a clamping sleeve, which is provided for firmly clamping a fastening section of the valve element in a control valve housing of the control valve.

3. Vacuum brake booster according to claim 2, wherein the guiding channel is formed at least partly by a radially inner cylindrical section of the clamping sleeve.

4. Vacuum brake booster according to claim 2, wherein the guiding channel is formed at least partly by a guiding channel sleeve, which is mounted in the control valve housing.

5. Vacuum brake booster according to claim 4, wherein the guiding channel sleeve has a radial projection, by which it is mounted in the control valve housing.

6. Vacuum brake booster according to claim 5, wherein the guiding channel sleeve has a radial projection, by which it is mounted in the control valve housing on a diameter step of the clamping sleeve.

7. Vacuum brake booster according to claim 5, wherein the guiding channel sleeve extends, starting from the radial projection, in at least one axial direction to form the guiding channel.

8. Vacuum brake booster according to claim 4, wherein the guiding channel sleeve is mounted in the control valve housing via the clamping sleeve.

9. Vacuum brake booster according to claim 1, wherein the guiding channel is of stepped form with flow channel sections of different flow diameters, and narrows in the direction towards the valve seat, the flow channel section with the smallest flow diameter being less than or equal to the sealing seat diameter.

10. Vacuum brake booster according to claim 9, wherein the guiding channel is of rounded form in the region of flow diameter steps.

11. Vacuum brake booster according to claim 1, wherein the guiding channel is of smoothly rounded form in an inlet region facing the surrounding atmosphere.

12. Vacuum brake booster according to claim 1, wherein the force input member extends through the guiding channel substantially concentrically thereto.

13. Vacuum brake booster according to claim 1, further comprising at least one filter element, which is arranged upstream of the guiding channel.

14. Vacuum brake booster according to claim 1, wherein the flow diameter is dimensioned such that a flow opening with an effective area between about 110 mm$^2$ and 160 mm$^2$ results.

* * * * *